(12) United States Patent
Liew et al.

(10) Patent No.: US 12,540,971 B2
(45) Date of Patent: Feb. 3, 2026

(54) DEBUG DATA COMMUNICATION SYSTEM FOR MULTIPLE CHIPS

(71) Applicant: Intel Corporation, Santa Clara, CA (US)

(72) Inventors: Vui Yong Liew, Bukit Mertajam (MY); Zhenyu Zhu, Folsom, CA (US); Mikal C. Hunsaker, El Dorado Hills, CA (US); Wai Mun Ng, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 977 days.

(21) Appl. No.: 17/461,364

(22) Filed: Aug. 30, 2021

(65) Prior Publication Data
US 2021/0389371 A1    Dec. 16, 2021

(51) Int. Cl.
| | | |
|---|---|---|
| G06F 13/00 | (2006.01) |
| G01R 31/317 | (2006.01) |
| G01R 31/3185 | (2006.01) |
| G01R 31/3193 | (2006.01) |
| G06F 13/16 | (2006.01) |
| G06F 13/42 | (2006.01) |

(52) U.S. Cl.
CPC ........ *G01R 31/31705* (2013.01); *G01R 31/318533* (2013.01); *G01R 31/31935* (2013.01); *G06F 13/1678* (2013.01); *G06F 13/4282* (2013.01)

(58) Field of Classification Search
CPC ...... G01R 31/31705; G01R 31/318566; G01R 31/318533; G01R 31/31903; G06F 11/2236; G06F 11/3636; G06F 11/221; G06F 11/362
See application file for complete search history.

(56) References Cited

U.S. PATENT DOCUMENTS

| | | | |
|---|---|---|---|
| 7,360,204 B2* | 4/2008 | Bates .................. | G06F 11/3698 717/124 |
| 7,870,438 B2* | 1/2011 | Bartik ................. | G06F 11/3476 717/124 |
| 8,666,690 B2* | 3/2014 | Deogharia .......... | G06F 11/3656 702/120 |

(Continued)

FOREIGN PATENT DOCUMENTS

| | | |
|---|---|---|
| EP | 2778930 A2 | 9/2014 |
| WO | 2017184265 A1 | 10/2017 |

OTHER PUBLICATIONS

EPO; Extended European Search Report issued in EP Patent Application No. 22183321.3, 16 pages.

(Continued)

*Primary Examiner* — Esaw T Abraham
(74) *Attorney, Agent, or Firm* — Alliance IP, LLC

(57) ABSTRACT

An apparatus comprises a first semiconductor chip comprising a first communication controller to receive first debug data from a second semiconductor chip; a memory to store the first debug data from the second semiconductor chip and second debug data of the first semiconductor chip; and a second communication controller to transmit the first debug data from the second semiconductor chip and the second debug data of the first semiconductor chip to an output port of the first semiconductor chip.

18 Claims, 9 Drawing Sheets

(56) References Cited

U.S. PATENT DOCUMENTS

| | | | | |
|---|---|---|---|---|
| 8,683,265 | B2* | 3/2014 | Rentschler | G06F 11/3656 |
| | | | | 714/30 |
| 8,990,633 | B2* | 3/2015 | Xu | G06F 11/26 |
| | | | | 714/45 |
| 10,580,512 | B2* | 3/2020 | Subramanian | G11C 29/38 |
| 10,754,760 | B1* | 8/2020 | Levy | G06F 11/3636 |
| 10,789,153 | B2* | 9/2020 | Ansari | G06F 11/2733 |
| 10,895,597 | B2* | 1/2021 | Peng | G06F 13/4282 |
| 2011/0209003 | A1 | 8/2011 | Matsukawa | |
| 2013/0139002 | A1* | 5/2013 | Huang | G06F 11/3656 |
| | | | | 714/E11.178 |
| 2017/0115344 | A1 | 4/2017 | Kuehnis et al. | |
| 2018/0095815 | A1 | 4/2018 | Kh et al. | |
| 2019/0095316 | A1 | 3/2019 | Nagesh et al. | |
| 2019/0196931 | A1 | 6/2019 | Kuehnis et al. | |
| 2019/0251010 | A1 | 8/2019 | Bhutada et al. | |
| 2020/0285559 | A1 | 9/2020 | Kuehnis et al. | |

OTHER PUBLICATIONS

Intel; "How does the producer, consumer, and manager strategy in the programming guide work?" retrieved from the Internet at https://community.intel.com/t5/Intel-Quartus-Prime-Software/How-does-the-producer-consumer-and-manager-strategy-in-the/td-p/255008; Feb. 3, 2018; 8 pages.

Intel; "Enhanced Serial Peripheral Interface (eSPI), Interface Base Specification (for Client and Server Platforms)," Jan. 2016; 130 pages.

EPO Communication Pursuant to Article 94(3) in EP Application Serial No. 22183321.3 mailed on Oct. 20, 2025 (12 pages).

* cited by examiner

DEBUG DATA COMMUNICATION SYSTEM FOR MULTIPLE CHIPS

BACKGROUND

Debug functionality is a critical capability of any system in order to get the system from manufacturing to production to deployment. A computer system may include various components that generate debug data to assist in troubleshooting problems. For example, a computer system may include trace hardware to collect trace data from various hardware components (e.g., hardware functional blocks interacting via a debug trace fabric), firmware components, and/or software components, encode the trace data into trace packets, and then transmit the trace packets to various trace destinations. The trace packets may be analyzed manually by a user after being collected, for example using a debugger application.

BRIEF DESCRIPTION OF THE DRAWINGS

Like reference numbers and designations in the various drawings indicate like elements.

DETAILED DESCRIPTION

Figure 1:
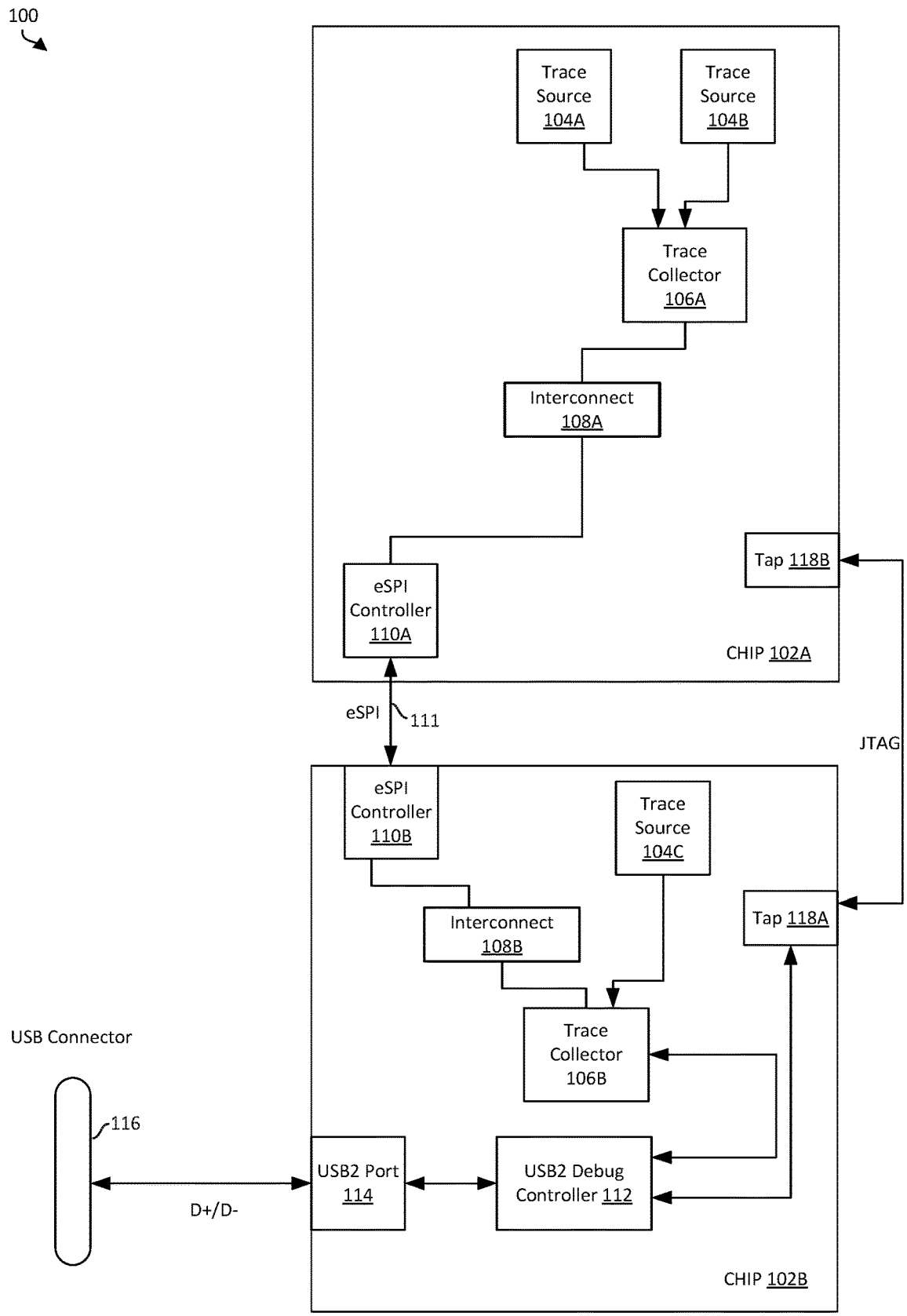
FIG. 1 illustrates a computer system comprising multiple chips with debug functionality in accordance with certain embodiments.

FIG. 1 illustrates a first chip 102A and a second chip 102B coupled via an Enhanced Serial Peripheral (eSPI) bus 111. In some embodiments, the first chip 102 may comprise a processor, such as a central processing unit (CPU) or system-on-chip (SOC) and the second chip 102 may comprise an I/O controller, such as a platform controller hub (PCH). As one example, system 100 may include a client desktop platform comprising a socket for chip 102A (e.g., CPU or SOC) and a soldered connection to the second chip 102B (e.g., PCH). The first chip 102A and second chip 102B may be coupled together via one or more other communication interfaces (not shown), such as a high-power, high-bandwidth interface such as a Direct Media Interface (DMI), Peripheral Component Interconnect Express (PCIe) interface, or other suitable interface.

Each chip 102 includes one or more trace sources 104 (e.g., 104A-104C) to generate traces or other debug information. The traces are passed to a trace collector (e.g., 106A or 106B). The traces on the first chip 102A are sent through interconnects 108A and 108B and eSPI bus 111 to trace collector 106B. The traces are then read out through a port of the second chip 102B (depicted as Universal Serial Bus 2 (USB2) Port 114 in FIG. 1) by USB2 debug controller 112.

In some systems, each chip has its own debug port to read debug data out (and thus the debug data is not passed over a link between the two chips). However, this requires a debugger to use multiple debug ports to capture the debug data. This also makes the debugging setup more complex, as software used to decode both sets of debug data and synchronize them together becomes more complex. Additionally (e.g., in the case of client desktop system), the debug port IO voltage could be phased out in future chips, thus making debug port support on advanced chips more challenging.

Various embodiments of the present disclosure provide a debug port (e.g., 114) on a single chip (e.g., 102B) to access the debug data from multiple chips (e.g., chip 102A and chip 102B). In some embodiments, the debug port is placed on a less advanced silicon process chip while still allowing access to debug data from a more advanced process chip (e.g., that may not support the IO voltage used by the debug port, such as USB2 3.3V IO). Thus, the first chip 102A may be implemented without a port (e.g., USB2, embedded USB2, etc.) used for reading out the debug data. Various embodiments simplify the debug data access procedure and software used to interpret the debug data. Some embodiments may allow the debug data to be read out, even when one or more of the chips are in a low power mode (e.g., where one or more interfaces between the chips are disabled in the low power mode, but a low power interface such as eSPI is still enabled and used to transport the debug data).

In an embodiments, a new transaction type over the eSPI bus 111 is defined and used to transport debug data of the first chip to the second chip. The eSPI bus 111 may be used for other types of communications between the first chip 102A and the second chip 102B, such as flash storage access, and may be leveraged in order to also transport debug data from the first chip to the second chip.

A trace source 104 comprises any suitable circuitry to generate a trace or other debug data. For example, a trace source may comprise a processor core, controller (e.g., memory controller, a controller for an internal interconnect fabric, a controller for external I/O, etc.), or other circuitry group. In various embodiments, a trace source may provide instruction tracing (e.g., data indicating whether conditional branches are taken or not taken, target addresses of indirect branch instructions, target addresses of mispredicted return instructions, a log of each instruction that is executed by a processor, or other data related to control flow), internal fabric tracing, memory command tracing, or external Input/Output (I/O) tracing. A trace source may be used, e.g., to reconstruct the control flow of a component.

Traces and other debug data may be transferred to a trace collector 106, which acts as a buffer to temporarily store the trace and other debug data before the data is sent towards its destination. In various embodiments, each trace or other collection of debug data may be tagged, e.g., by its local trace collector 106, with one or more identifiers (such as a primary identifier, an MIPI source identifier, a channel identifier, etc.) so that the consumer of the debug data (e.g., debug software) is able to identify the source of the debug data. A trace collector 106 may also add a timestamp to the trace data or other debug data, to allow the debug software to correlate different types of events between the different trace sources 104.

Interconnects 108 may comprise any one or more suitable on-chip interconnects, such as a Debug Trace Fabric (DTF), Intel On-chip System Fabric (IOSF), AXI Interconnect, Advanced Peripheral Bus (APB), any AMBA® bus, or other suitable on-chip interconnect fabric.

eSPI controllers 110 and eSPI bus 111 may implement the eSPI protocol. eSPI is a low power (e.g., the IO voltage may be 1.8 volts), low pin count (e.g., 8 pins or less) communication interface. In some embodiments, the eSPI bus 111 may be used, e.g., to share SPI flash devices on or coupled to the second chip 102B with the first chip 102A or to tunnel messages (e.g., general-purpose input/output (GPIO) and System Management Bus (SMBus) communications). eSPI may utilize 1-bit, 2-bit, or 4-bit communications at relatively low speeds (e.g., 20 to 66 MHz).

The eSPI controller 110a may also communicate trace data or other debug data stored by the trace collector 106A over the eSPI bus 111 to the eSPI controller 110B. Operation of the eSPI controllers 110 and eSPI bus 111 is described below in more detail in connection with FIGS. 3 and 5. Although this disclosure focuses on an eSPI communication interface to communicate the trace data and other debug data between chips, in other embodiments, any suitable communication interface may be used to carry this data, such as relatively lower bandwidth interfaces such as SMBus, I2C, or I3C, or relatively higher bandwidth interfaces such as PCIe or CXL (although higher bandwidth interfaces may be more complex to implement).

The trace data or other debug data is communicated from the eSPI controller 110B over interconnect 108B to trace collector 106B. Trace collector 106B also collects trace data or other debug data from one or more trace sources 104C of the second chip 102B.

USB2 debug controller 112 may transfer the trace data or other debug data from the trace collector 106B to the USB2 port 114. The USB2 debug controller 112 receives notifications (e.g., doorbell messages) from trace collector 106B when a storage threshold is met and transfers data out of the trace collector 106B in response. In some embodiments, the USB2 debug controller 112 may communicate with the trace collector 106B using primary scalable fabric (PSF) (which is based on the IOSF standard) or other suitable protocol.

A consumer of the debug information may receive this trace data or other debug data by plugging into the USB connector 116 (e.g., a type-C connector). Although a USB2 port 114 and controller 112 are shown, other embodiments may include any suitable type of port and associated controller, such as an MIPI Parallel Trace Interface (MIPI PTI) over GPIO pins, USB3, USB4, or I3C, among others.

In addition to transporting the trace data or other debug data, the USB2 debug controller 112 may receive commands through the USB2 port 114 and forward the commands to Joint Test Action Group (JTAG) taps 118A and 118B. The commands may be used to control the state of the chips 102A and 102B during debug operations.

In various embodiments, the interface between the first chip 102A and the second chip 102B (e.g., the eSPI bus 111) that is used to send the trace data or other debug data may be operable in one or more lower power states of the first chip 102A and/or second chip 102B whereas one or more other communication interfaces between the first chip 102A and the second chip 102B (e.g., a DMI interface, a PCIe interface, etc.) are not operable in the one or more low power states. Accordingly, debug may be performed in a lower power state.

In some embodiments, the interface between the first chip 102A and the second chip 102B (e.g., the eSPI bus 111) that is used to send the trace data or other debug data is the first communication interface to be usable after a reset or reboot is applied to one or both of chips 102A and 102B.

In various embodiments, the interface between the first chip 102A and the second chip 102B (e.g., the eSPI bus 111) that is used to send the trace data or other debug data has a maximum bandwidth or power usage that is lower than a maximum bandwidth or power usage of one or more other communication interfaces between the two chips 102.

Figure 2:
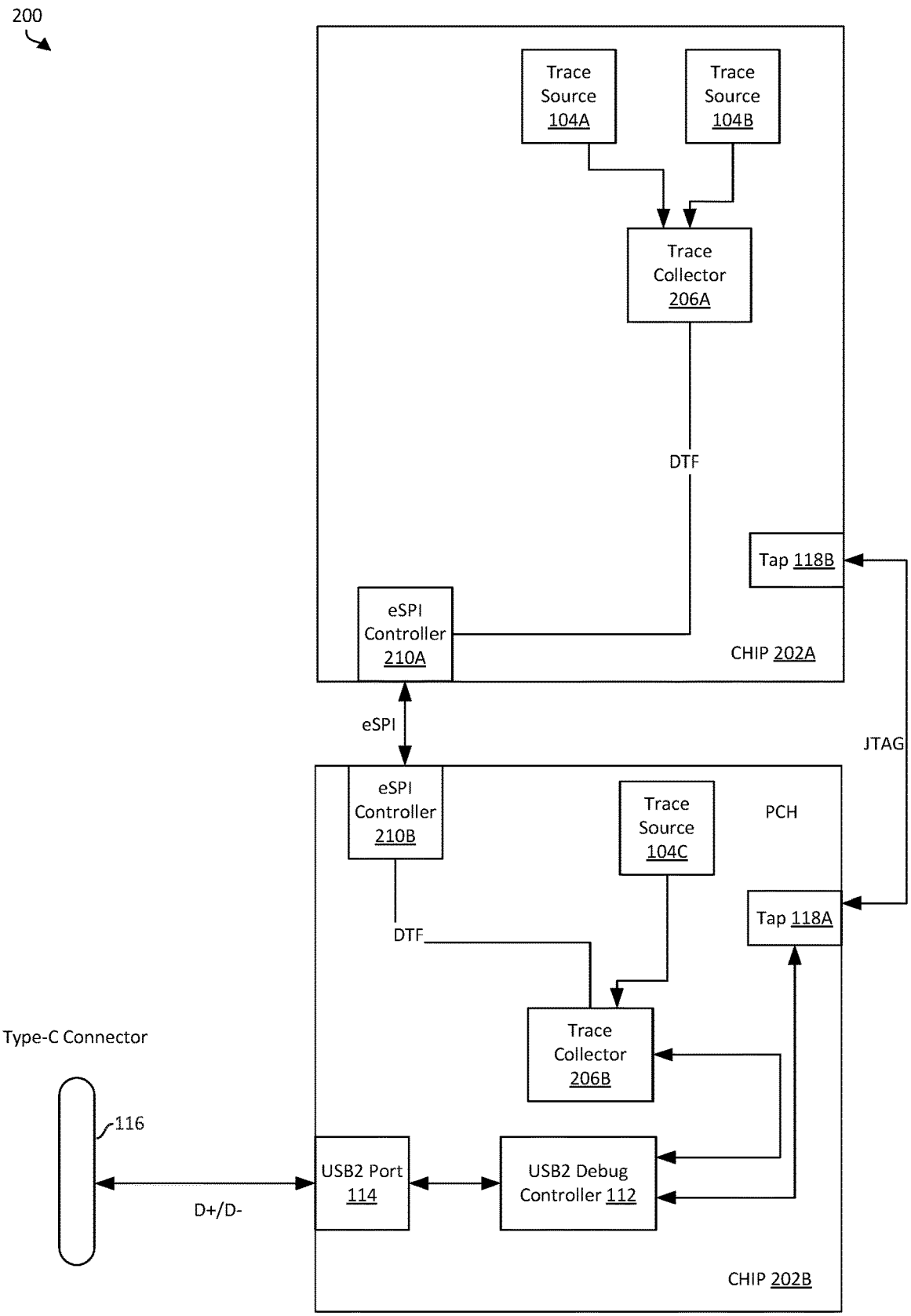
FIG. 2 illustrates a first implementation of the computer system of FIG. 1 in accordance with certain embodiments.

FIG. 2 illustrates a first implementation of the computer system of FIG. 1 in accordance with certain embodiments. In the computer system 200, the output of the trace collector 206A is connected directly to the eSPI controller 210. Similarly, the output of the eSPI controller 210B is connected directly to trace collector 206B. In one embodiment, the interconnect between trace collector 206A and eSPI controller 210A is in accordance with DTF. Similarly, the interconnect between eSPI controller 210B and the trace collector 206B is in accordance with DTF. In this embodiment, the formatting of the data passed between the trace collector 206A and the eSPI controller 210A does not need to be reformatted according to another internal fabric protocol of chip 202A. Similarly, the interconnect between eSPI controller 210B and trace collector 206B is DTF. Accordingly, the formatting of the data passed between the eSPI controller 210B and the trace collector 206B also does not need to be reformatted according to another internal fabric protocol of chip 202B.

Figure 3:
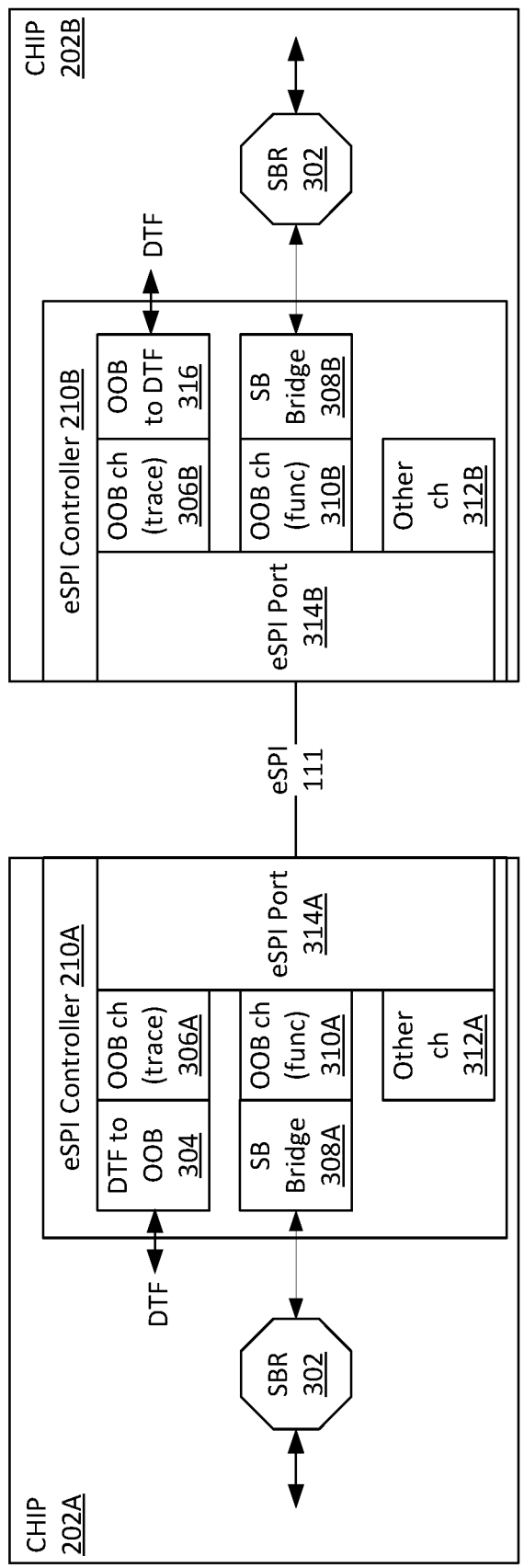
FIG. 3 illustrates example eSPI controllers in accordance with certain embodiments.

FIG. 3 illustrates example eSPI controllers 210 in accordance with certain embodiments. eSPI controller 210A is part of chip 202A. Chip 202A also includes a side-band router 302. eSPI controller 210B is part of chip 202B. Chip 202B also includes a side-band router 302.

eSPI controller 210A includes DTF to out-of-band (OOB) converter bridge 304, OOB trace channel 306A, side-band (SB) bridge 308A, OOB function channel 310A, and other channel 312A all coupled to eSPI port 314A.

eSPI controller 210B includes OOB trace channel 306B, OOB to DTF converter bridge 316, OOB functional channel 310B, side-band (SB) bridge 308B, and other channels 312B all coupled to eSPI port 314B.

The trace data or other debug data is received at the DTF to OOB converter bridge 304 from the trace collector 206A in accordance with DTF. The bridge 304 converts the trace data or other debug data from the DTF format into a format that enables transport of the trace data or other debug data over an OOB channel of the eSPI bus 111. The SB bridge 308A of the eSPI controller 210 may couple to SBR 302 and receive sideband data for transmission over the OOB channel of the eSPI bus 111.

In various embodiments, a physical OOB channel on the eSPI bus 111 is shared between OOB trace channel 306A and OOB functional trace channel 310A. The trace data or other debug data is sent over the OOB trace channel 306A and functional data, such as functional communications to eSPI components such as an embedded controller (EC) or board microcontroller (BMC), is sent over the OOB functional channel 310A (channels 306A and 310A may be considered virtual channels that share a single physical OOB channel on the eSPI bus 111). In this manner, allowance is made for transfer of the trace data or other debug data over the eSPI bus without the addition of an extra pin for the ports 314 and data line for the eSPI bus 111. In various embodiments, the OOB trace channel 306A and the OOB functional channel 310A are non-blocking to each other.

In some embodiments, communications over the OOB channel may be controlled according to a transaction credit system (e.g., one or more packets may be sent across the OOB channel of the eSPI bus 111 when credit is available and buffered when credit is not available). In some embodiments, the OOB trace channel 306A may be assigned a first credit amount and the OOB functional channel 310A may be assigned a second credit amount. If trace data or other debug data is received at eSPI controller 210A when credit for the OOB trace channel 306A is not available, the trace data or other debug data may be buffered by the eSPI controller 210A until credit is available and the trace data or other debug data is transmitted over the OOB channel. Similarly, sideband data is not allowed over the OOB channel unless credit is available for the OOB functional channel 310A. In some embodiments, an aggregate transactional credit is applicable to the OOB physical channel and neither channel 306A or 310A is allowed to send packets over the eSPI bus 111 if this credit is depleted. As in other credit based communication systems, credit may be depleted when a packet is sent by eSPI controller 210A and replenished when the packet is successfully received by eSPI controller 210B (e.g., responsive to an acknowledgement signal received at eSPI controller 210A).

In various embodiments, the DTF to OOB converter bridge 304 may format the trace data or other debug data into packets that are sent across the OOB channel and SB bridge 308A may format the sideband data into packets that are also sent across the OOB channel. In various embodiments, in order to distinguish packets that include the trace data or other debug data from the sideband data, the packet data may include a destination address (e.g., a packet including trace data or other debug data may include a destination address of the OOB to DTF converter bridge 316 while a packet including normal sideband data may include a destination address of the SB bridge 308B) or other identifier.

In various embodiments, trace data and other debug data communication that are sent to the eSPI controller 210A may have an ID (e.g., address) of the DTF to OOB converter 304, while normal sideband data (e.g., OOB functional communications) may have an ID of the SB bridge 308A.

The SB bridge 308A may provide a protocol conversion between a format received from the SBR 302 and the eSPI protocol format. The SB bridge 308A may also remap endpoint IDs (as the chips may have overlapping endpoint IDs). SB bridge 308A may also perform credit tracking.

An SBR 302 may route sideband signals between different side-band endpoints on a chip (e.g., 202A or 202B). Any number of endpoints using any suitable communication protocols may utilize the SBRs 302 to route sideband data.

Other channels 312A may include any suitable number of other physical channels for communication between the chips 202A and 202B. In one embodiment, other channels 312A include three physical channels (separate from the OOB physical channel). The eSPI bus may include wires for the other channels 312A and the OOB channel as well as other supporting wires (e.g., for a reset signal, ship select signal, clock signal, and alert signal).

Figure 4:
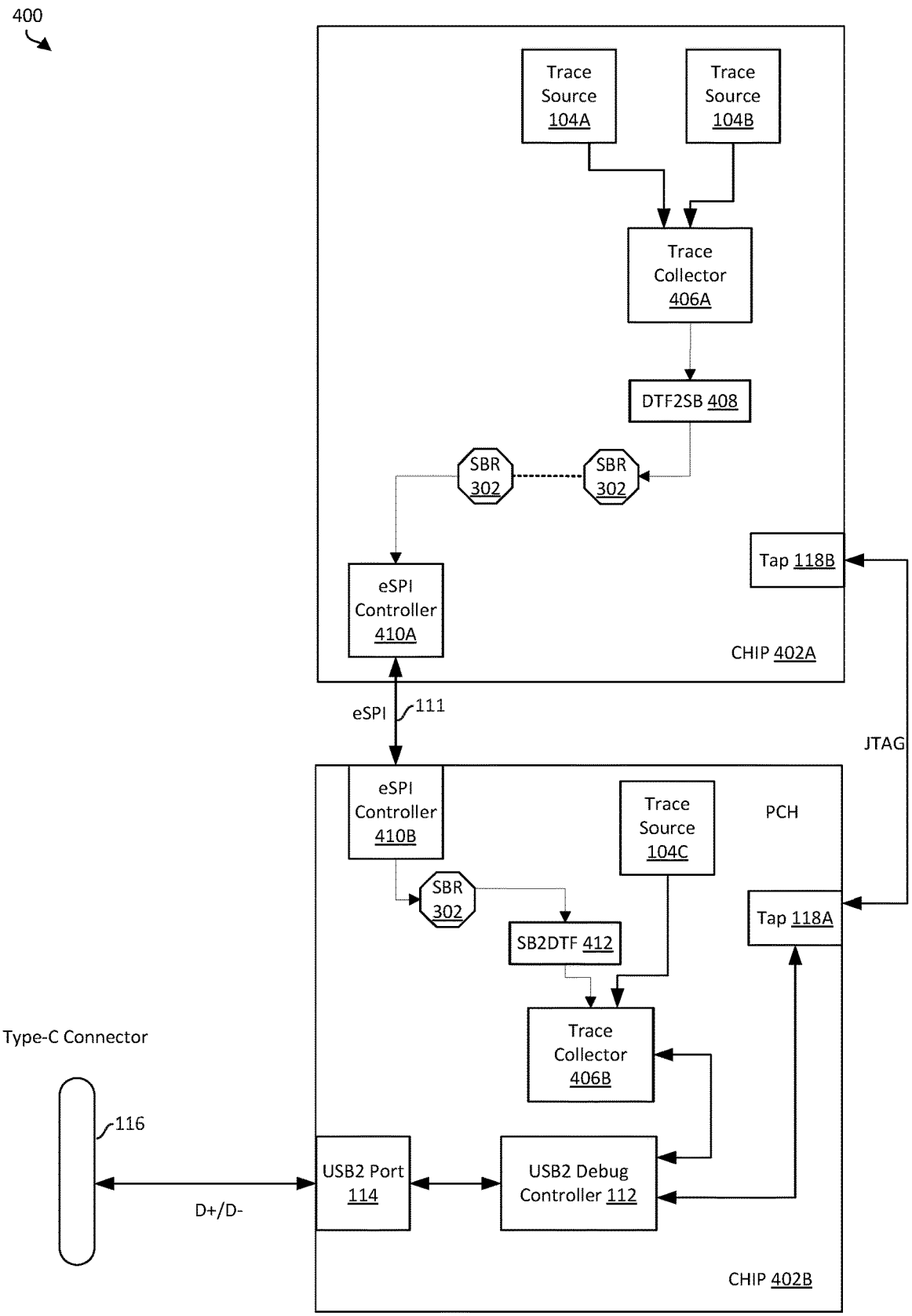
FIG. 4 illustrates a second implementation of the computer system of FIG. 1 in accordance with certain embodiments.

FIG. 4 illustrates a second implementation of the computer system of FIG. 1 in accordance with certain embodiments. In computer system 400, the trace collector 406A outputs data in a first format (e.g., DTF in the embodiment depicted) which is converted to a second format (e.g., Intel On-chip System Fabric (IOSF)-Side Band (SB)) before being transported to the eSPI controller 410A. In the embodiment depicted, DTF2SB converter 408 provides this conversion. The converted trace data or other debug data is then routed through one or more SBRs 302 before arriving at the eSPI controller 410A. the eSPI controller 410A converts the data from the second format into a format compatible with eSPI.

After being sent over the eSPI bus 111, the data arrives as eSPI controller 410B, which converts the data back to the second format. The data is routed through one or more SBRs 302 and is then converted back to the first form by SB2DTF converter 412. The data is then placed into the trace collector 406B. Trace collector 406B also collects data from one or more trace sources 104C in the first format (e.g., DTF).

When the debug data store in the trace collector 406B reaches a threshold, the trace collector 406B will send a message to the USB2 debug controller 112 which in turn will pull the trace data or other debug data from the trace collector 406B and send it over USB2 port 114.

Figure 5:
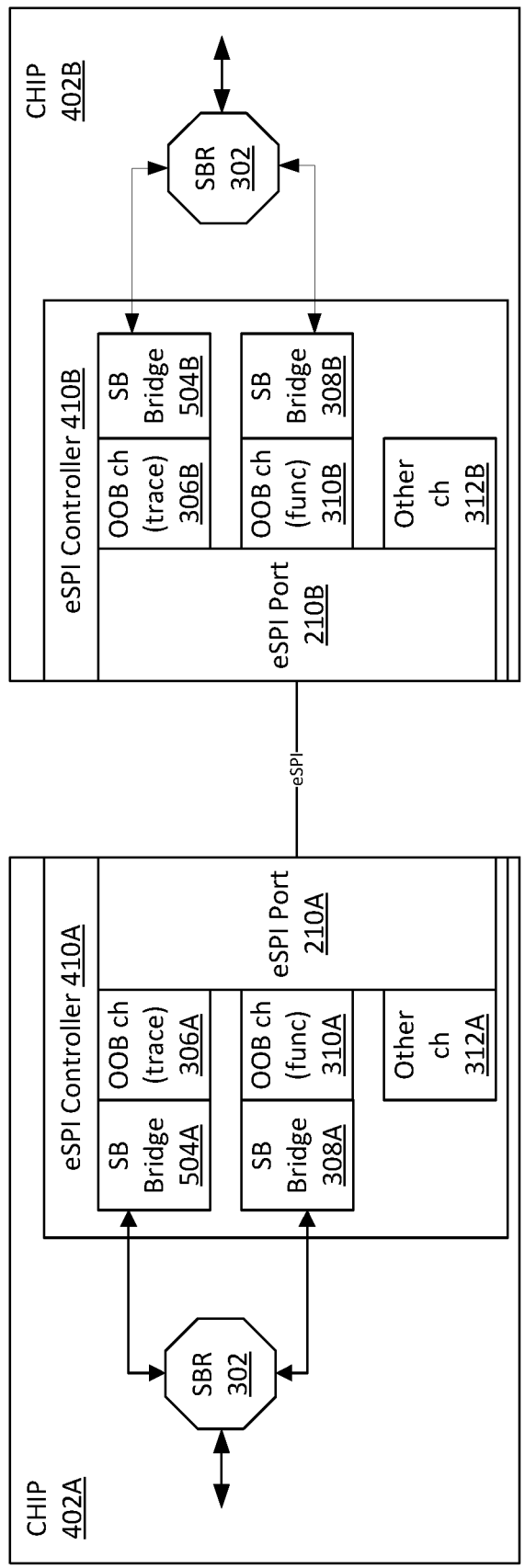
FIG. 5 illustrates additional example eSPI controllers in accordance with certain embodiments.

FIG. 5 illustrates example eSPI controllers 410 in accordance with certain embodiments. eSPI controller 410A is part of chip 402A. Chip 402A also includes a side-band router 302. eSPI controller 410B is part of chip 402B. Chip 402B also includes a side-band router 302.

The eSPI controller 410A is similar to eSPI controller 210A, except the sideband bridge 504A replaces the DTF to OOB converter bridge 304. Because the trace data and other debug data received by the eSPI controller 410A is in the second format (e.g., IOSF-SB), the SB bridge 504A may convert the data from the second format to a format compatible with eSPI. Similarly, the SB bridge of the eSPI controller 410B on the second chip 402B will convert the received data from the eSPI format to the second format (e.g., IOSF-SB) before forwarding the data to the SBR 302.

In various embodiments, trace data and other debug data communication that are sent to the eSPI controller 410A may have an ID (e.g., address) of the SB bridge 504A, while OOB functional communications may have an ID of the SB bridge 308A. In various embodiments, in order to distinguish packets sent over the eSPI bus that include the trace data or other debug data from the sideband data, the packet may include a destination address or other identifier. For example, a packet including trace data or other debug data may include a destination address of the SB bridge 504B while a packet including normal sideband data may include a destination address of the SB bridge 308B.

In various embodiments, the second chip may be configured to receive trace data or other debug data from multiple other chips. For example, a third chip of system 100 could also include an eSPI controller 110 to send trace data or other debug data to the second chip 102B. In some embodiments, the second chip 102B may include an additional eSPI controller 110 to receive such data. The received data could then be placed in trace collector 106B and then read out through USB2 port 114. Thus, trace data or other debug data from two, three, or any other number of chips could be read out through a single USB2 port 114.

Figure 6:
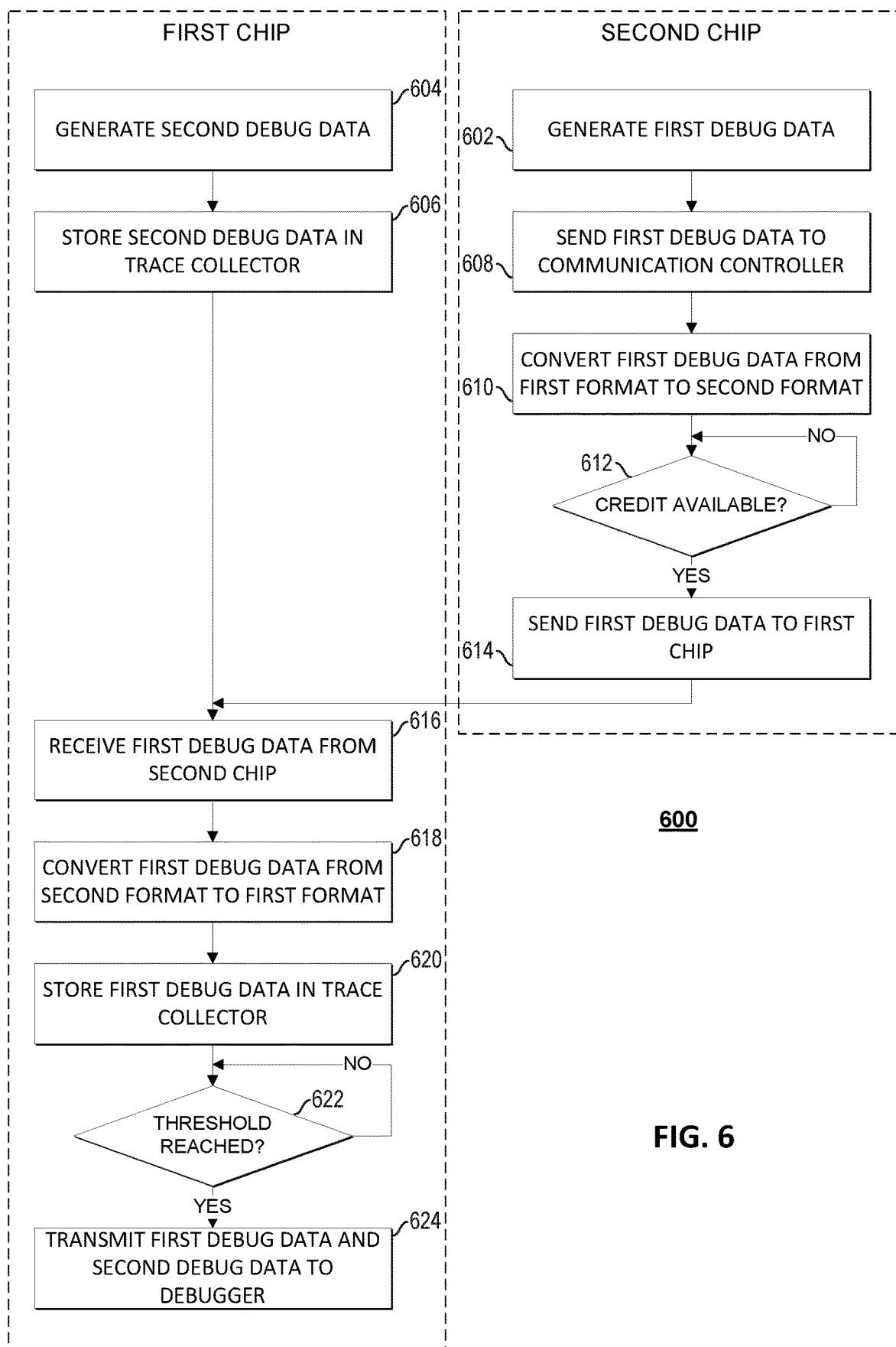
FIG. 6 illustrates a flow for collecting debug data from multiple chips in accordance with various embodiments.

FIG. 6 illustrates a flow 600 for collecting debug data from multiple chips in accordance with various embodiments. Flow 600 depicts operations occurring at a first chip (e.g., 102B) and a second chip (e.g., 102A).

At 602, first debug data is generated. The first debug data may include, e.g., trace data for a component of the second chip. At 604, second debug data is generated (the second debug data could be generated concurrently with, before, or after the generation of the first debug data). The second debug data may include, e.g., trace data for a component of the first chip. At 606, second debug data is stored in a trace collector of the first chip.

At 608, the first debug data is sent to a communication controller (e.g., eSPI controller 110A) of the second chip. At

610, the first debug data is converted from a first format (e.g., a format of an internal fabric of the second chip) to a second format (e.g., a format according to the eSPI protocol).

At 612, a determination is made as to whether credit is available to send the first debug data to the first chip. If no credit is available, the flow pauses until credit is available. When credit is available, the first debug data is sent to the first chip at 614.

At 616, the first debug data is received at the first chip from the second chip. At 618, the first debug data is converted from the second format (e.g., according to the eSPI protocol) to the first format (e.g., the internal fabric format). At 620, the first debug data is stored in the trace collector of the first chip. At 622, a determination is made as to whether a storage threshold has been reached (e.g., whether a threshold amount of debug data is stored in the trace collector). If the threshold has been reached, debug data may continue to be stored until the threshold is reached. At 624, the first debug data and the second debug data is sent out of a port (e.g., USB port) to a debugger.

Figure 7:
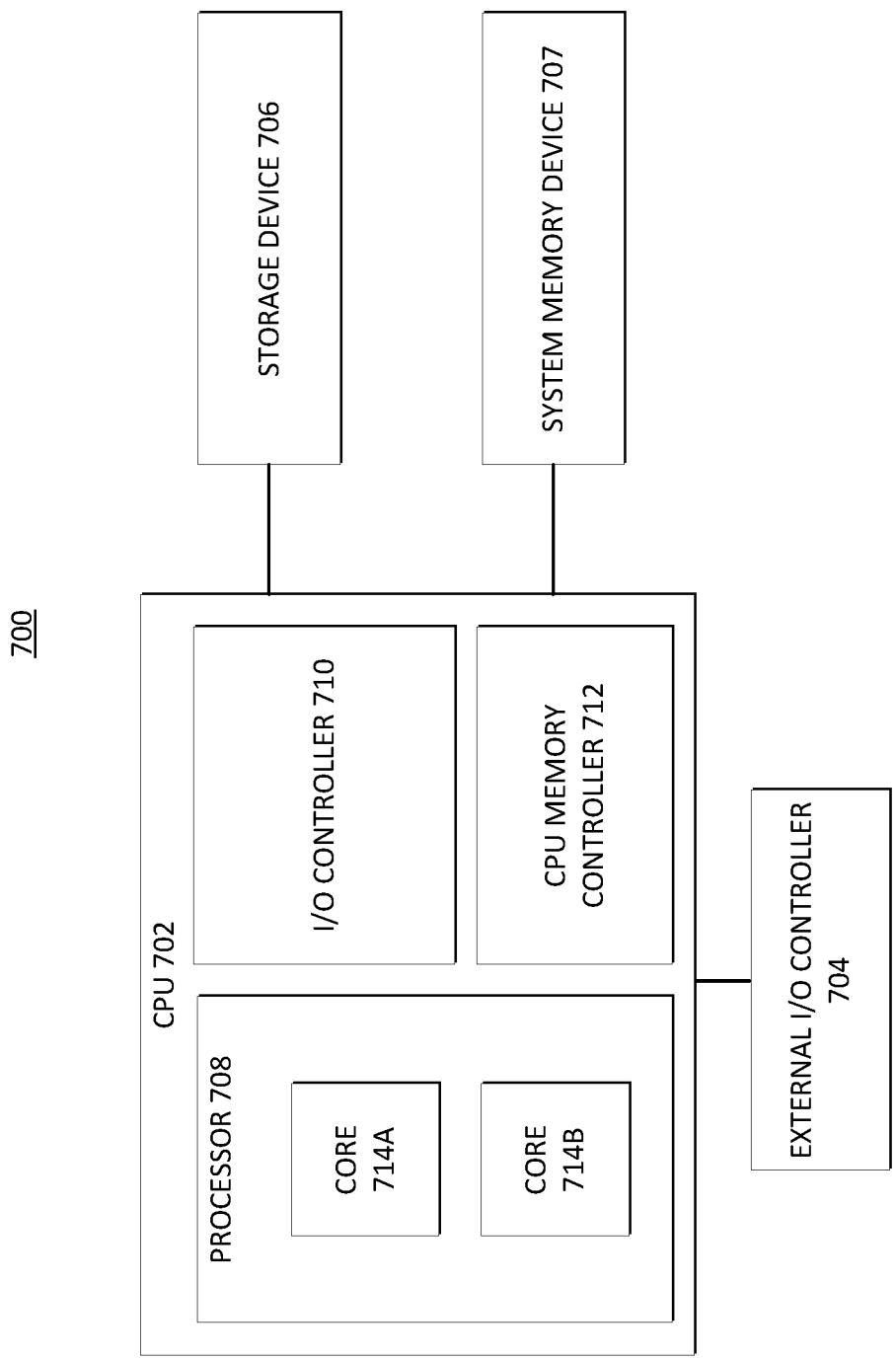
FIG. 7 illustrates an example computer system in accordance with certain embodiments.
Figure 8:
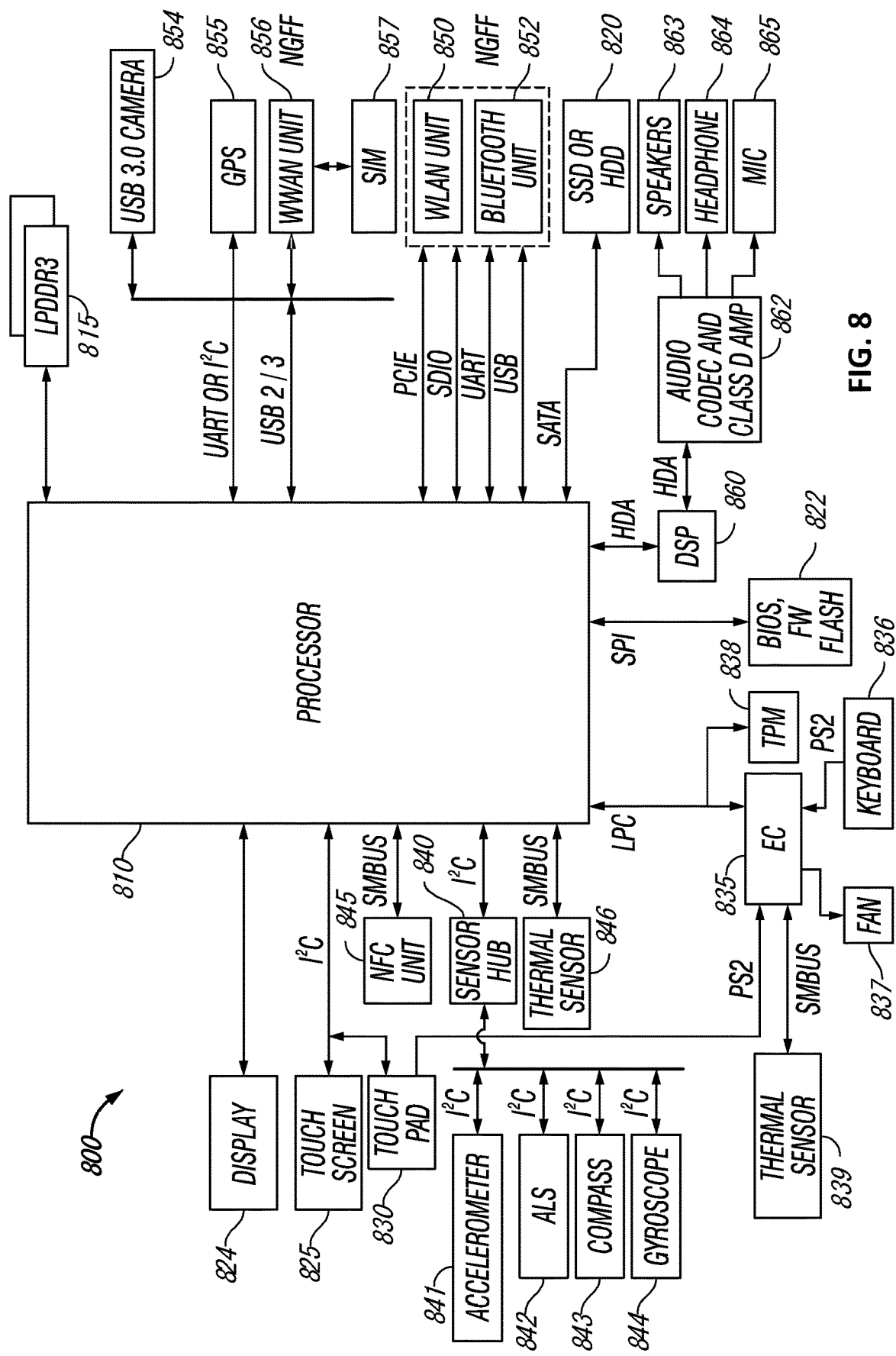
FIG. 8 illustrates a block diagram of components present in a computing system in accordance with various embodiments.
Figure 9:
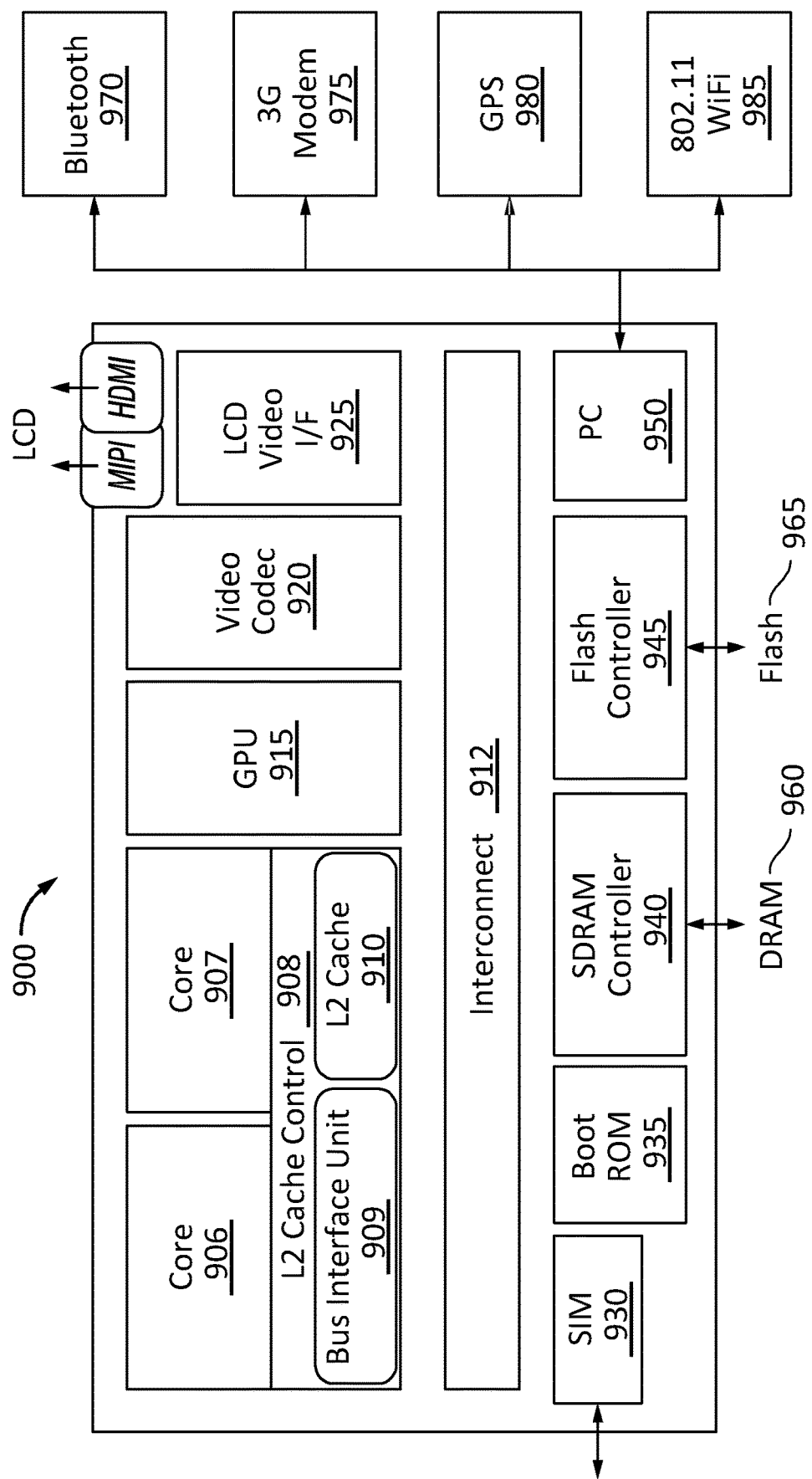
FIG. 9 illustrates a block diagram of another computing system in accordance with various embodiments.

FIGS. 7-9 depict example systems in which various embodiments described herein may be implemented. For example, any of the systems depicted (or a component thereof) could implement system 100, 200, or 400 (or components thereof). As another example, chip 102A may correspond to or comprise CPU 702, processor 810, or SOC 900. As yet another example, chip 102B may correspond to or comprise external I/O controller 704.

FIG. 7 illustrates components of a computer system 700 in accordance with certain embodiments. System 700 includes a central processing unit (CPU) 702 coupled to an external input/output (I/O) controller 704, a storage device 706 such as a solid state drive (SSD) or a dual inline memory module (DIMM), and system memory device 707. During operation, data may be transferred between a storage device 706 and/or system memory device 707 and the CPU 702. In various embodiments, particular memory access operations (e.g., read and write operations) involving a storage device 706 or system memory device 707 may be issued by an operating system and/or other software applications executed by processor 708.

CPU 702 comprises a processor 708, such as a microprocessor, an embedded processor, a digital signal processor (DSP), a network processor, a handheld processor, an application processor, a co-processor, an SOC, or other device to execute code (e.g., software instructions). Processor 708, in the depicted embodiment, includes two processing elements (cores 714A and 714B in the depicted embodiment), which may include asymmetric processing elements or symmetric processing elements. However, a processor may include any number of processing elements that may be symmetric or asymmetric. CPU 702 may be referred to herein as a host computing device (though a host computing device may be any suitable computing device operable to issue memory access commands to a storage device 706).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 714 (e.g., 714A or 714B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

In some embodiments, processor 708 may comprise a processor unit, such as a processor core, graphics processing unit, hardware accelerator, field programmable gate array, neural network processing unit, artificial intelligence processing unit, inference engine, data processing unit, or infrastructure processing unit.

I/O controller 710 is an integrated I/O controller that includes logic for communicating data between CPU 702 and I/O devices. In other embodiments, the I/O controller 710 may be on a different chip from the CPU 702. I/O devices may refer to any suitable devices capable of transferring data to and/or receiving data from an electronic system, such as CPU 702. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 706 coupled to the CPU 702 through I/O controller 710.

An I/O device may communicate with the I/O controller 710 of the CPU 702 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 710 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 710 may be located off-chip (e.g., not on the same chip as CPU 702) or may be integrated on the same chip as the CPU 702.

CPU memory controller 712 is an integrated memory controller that controls the flow of data going to and from one or more system memory devices 707. CPU memory controller 712 may include logic operable to read from a system memory device 707, write to a system memory device 707, or to request other operations from a system memory device 707. In various embodiments, CPU memory controller 712 may receive write requests from cores 714 and/or I/O controller 710 and may provide data specified in these requests to a system memory device 707 for storage therein. CPU memory controller 712 may also read data from a system memory device 707 and provide the read data to I/O controller 710 or a core 714. During operation, CPU memory controller 712 may issue commands including one or more addresses of the system memory device 707 in order to read data from or write data to memory (or to perform other operations). In some embodiments, CPU memory controller 712 may be implemented on the same chip as CPU 702, whereas in other embodiments, CPU memory controller 712 may be implemented on a different chip than that of CPU 702. I/O controller 710 may perform similar operations with respect to one or more storage devices 706.

The CPU 702 may also be coupled to one or more other I/O devices through external I/O controller 704. In a particular embodiment, external I/O controller 704 may couple a storage device 706 to the CPU 702. External I/O controller 704 may include logic to manage the flow of data between one or more CPUs 702 and I/O devices. In particular embodiments, external I/O controller 704 is located on a motherboard along with the CPU 702. The external I/O controller 704 may exchange information with components of CPU 702 using point-to-point or other interfaces.

A system memory device 707 may store any suitable data, such as data used by processor 708 to provide the functionality of computer system 700. For example, data associated with programs that are executed or files accessed by cores 714 may be stored in system memory device 707. Thus, a system memory device 707 may include a system memory that stores data and/or sequences of instructions that are executed or otherwise used by the cores 714. In various embodiments, a system memory device 707 may store temporary data, persistent data (e.g., a user's files or instruction sequences) that maintains its state even after power to the system memory device 707 is removed, or a combination thereof. A system memory device 707 may be dedicated to a particular CPU 702 or shared with other devices (e.g., one or more other processors or other devices) of computer system 700.

In various embodiments, a system memory device 707 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 706 may store any suitable data, such as data used by processor 708 to provide functionality of computer system 700. For example, data associated with programs that are executed or files accessed by cores 714A and 714B may be stored in storage device 706. Thus, in some embodiments, a storage device 706 may store data and/or sequences of instructions that are executed or otherwise used by the cores 714A and 714B. In various embodiments, a storage device 706 may store persistent data (e.g., a user's files or software application code) that maintains its state even after power to the storage device 706 is removed. A storage device 706 may be dedicated to CPU 702 or shared with other devices (e.g., another CPU or other device) of computer system 700.

In various embodiments, storage device 706 may comprise a disk drive (e.g., a solid state drive); a memory card; a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, a semiconductor chip may be embodied in a semiconductor package. In various embodiments, a semiconductor package may comprise a casing comprising one or more semiconductor chips (also referred to as dies). A package may also comprise contact pins or leads used to connect to external circuits.

In some embodiments, all or some of the elements of system 700 are resident on (or coupled to) the same circuit board (e.g., a motherboard). In various embodiments, any suitable partitioning between the elements may exist. For example, the elements depicted in CPU 702 may be located on a single die (e.g., on-chip) or package or any of the elements of CPU 702 may be located off-chip or off-package. Similarly, the elements depicted in storage device 706 may be located on a single chip or on multiple chips. In various embodiments, a storage device 706 and a computing host (e.g., CPU 702) may be located on the same circuit board or on the same device and in other embodiments the storage device 706 and the computing host may be located on different circuit boards or devices.

The components of system 700 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 700, such as cores 714, one or more CPU memory controllers 712, I/O controller 710, integrated I/O devices, direct memory access (DMA) logic (not shown), etc. In various embodiments, components of computer system 700 may be coupled together through one or more networks comprising any number of intervening network nodes, such as routers, switches, or other computing devices. For example, a computing host (e.g., CPU 702) and the storage device 706 may be communicably coupled through a network.

Although not depicted, system 700 may use a battery and/or power supply outlet connector and associated system to receive power, a display to output data provided by CPU 702, or a network interface allowing the CPU 702 to communicate over a network. In various embodiments, the battery, power supply outlet connector, display, and/or network interface may be communicatively coupled to CPU 702. Other sources of power can be used such as renewable energy (e.g., solar power or motion based power).

Referring now to FIG. 8, a block diagram of components present in a computer system that may function as either a host device or a peripheral device (or which may include both a host device and one or more peripheral devices) in accordance with certain embodiments is described. As shown in FIG. 8, system 800 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 8, a processor 810, in one embodiment, includes a microprocessor, multi-core processor, multi-threaded processor, an ultra low voltage processor, an embedded processor, or other known processing element. In the illustrated implementation, processor 810 acts as a main processing unit and central hub for communication with many of the various components of the system 800. As one example, processor 810 is implemented as a system on a chip (SoC). As a specific illustrative example, processor 810 includes an Intel® Architecture Core™-based processor such as an i3, i5, i7 or another such processor available from Intel Corporation, Santa Clara, CA However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I2C interconnect. As further shown in FIG. 8, in addition to touch screen 825, user input by way of touch can also occur via a touch pad 830 which may be configured within the chassis and may also be coupled to the same I2C interconnect as touch screen 825.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 810 in different manners. Certain inertial and environmental sensors may couple to processor 810 through a sensor hub 840, e.g., via an I2C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which in some embodiments couple to processor 810 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 8, various peripheral devices may couple to processor 810. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 810 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 9, another block diagram for an example computing system that may serve as a host device or peripheral device (or may include both a host device and one or more peripheral devices) in accordance with certain embodiments is shown. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 900 includes 2 cores—906 and 907. Similar to the discussion above, cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 912 includes an on-chip interconnect, such as an IOSF, AMBA, or other interconnect discussed above, which potentially implements one or more aspects of the described disclosure.

Interconnect 912 provides communication channels to the other components, such as a Subscriber Identity Module (SIM) 930 to interface with a SIM card, a boot rom 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein.

In addition, the system illustrates peripherals for communication, such as a Bluetooth module 970, 3G modem 975, GPS 980, and WiFi 985. Note as stated above, a UE includes a radio for communication. As a result, these peripheral communication modules are not all required. However, in a UE some form of a radio for external communication is to be included.

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include, e.g., a microcontroller, a digital signal processor (DSP), an SOC, a network computer (NetPC), a set-top box, a network hub, a wide area network (WAN) switch, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components of the FIGs., subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes an apparatus comprising a first semiconductor chip comprising a first communication controller to receive first debug data from a second semiconductor chip; a memory to store the first debug data from the second semiconductor chip and second debug data of the first semiconductor chip; and a second communication controller to transmit the first debug data from the second semiconductor chip and the second debug data of the first semiconductor chip to an output port of the first semiconductor chip.

Example 2 includes the subject matter of Example 1, and wherein the first communication interface comprises an Enhanced Serial Peripheral (eSPI) controller.

Example 3 includes the subject matter of any of Examples 1 and 2, and wherein the second communication controller comprises a Universal Serial Bus controller.

Example 4 includes the subject matter of any of Examples 1-3, and wherein the first communication controller is to receive the first debug data over a first virtual channel that shares an out-of-band physical channel with a second virtual channel.

Example 5 includes the subject matter of any of Examples 1-4, and wherein the first virtual channel is non-blocking with respect to the second virtual channel.

Example 6 includes the subject matter of any of Examples 1-5, and wherein the first communication controller is to receive the first debug data from the second semiconductor chip during a period of time in which the second semiconductor chip is in a low power state.

Example 7 includes the subject matter of any of Examples 1-6, and further including a third communication controller that is to communicate with the second chip over a communication interface, wherein the communication interface is disabled during the period of time in which the second semiconductor chip is in the low power state.

Example 8 includes the subject matter of any of Examples 1-7, and wherein the second communication controller is to receive Joint Test Action Group (JTAG) commands for the first semiconductor chip and the second semiconductor chip.

Example 9 includes the subject matter of any of Examples 1-8, and wherein the first communication controller is to convert the first debug data into a format that is used by a trace source of the first semiconductor chip to communicate the second debug data to the memory.

Example 10 includes the subject matter of any of Examples 1-9, and wherein the first debug data comprises first trace data and the second debug data comprises second trace data.

Example 11 includes a system comprising a first semiconductor chip to aggregate first debug data from a plurality of components of the first semiconductor chip; send the first debug data to a first controller of the first semiconductor; and communicate, by the first controller, the first debug data over a first interface between the first semiconductor chip and a second semiconductor chip, wherein the first interface has a lower maximum bandwidth than a second interface between the first semiconductor chip and the second semiconductor chip.

Example 12 includes the subject matter of Example 11, and further including the second semiconductor chip, the second semiconductor chip comprising a second communication controller to receive the first debug data from the first semiconductor chip; a memory to store the first debug data received from the first semiconductor chip and second debug data of the second semiconductor chip; and a third communication controller to transmit the first debug data from the first semiconductor chip and the second debug data of the second semiconductor chip to an output port of the second semiconductor chip.

Example 13 includes the subject matter of any of Examples 11 and 12, and wherein the first semiconductor chip comprises a central processing unit and the second semiconductor chip comprises an external I/O controller.

Example 14 includes the subject matter of any of Examples 11-13, and wherein the first controller comprises an Enhanced Serial Peripheral (eSPI) controller.

Example 15 includes the subject matter of any of Examples 11-14, and further including a battery communicatively coupled to the first semiconductor chip, a display communicatively coupled to the first semiconductor chip, or a network interface communicatively coupled to the first semiconductor chip.

Example 16 includes a method comprising receiving, by a first communication controller of a first semiconductor chip, first debug data from a second semiconductor chip; storing, by a memory, the first debug data from the second semiconductor chip and second debug data of the first semiconductor chip; and transmitting, by a second communication controller of the first semiconductor chip, the first debug data from the second semiconductor chip and the second debug data of the first semiconductor chip to an output port of the first semiconductor chip.

Example 17 includes the subject matter of Example 16, and wherein the first communication interface comprises an Enhanced Serial Peripheral (eSPI) controller.

Example 18 includes the subject matter of any of Examples 16-17, and further including receiving, by the second communication controller, Joint Test Action Group (JTAG) commands for the first semiconductor chip and the second semiconductor chip.

Example 19 includes the subject matter of any of Examples 16-18, and further including converting the first debug data into a format that is used by a trace source of the first semiconductor chip to communicate the second debug data to the memory.

Example 20 includes the subject matter of any of Examples 16-19, and further including receiving the first debug data over a first virtual channel that shares an out-of-band physical channel with a second virtual channel.

Example 21 includes the subject matter of any of Examples 16-20, and wherein the second communication controller comprises a Universal Serial Bus controller.

Example 22 includes the subject matter of any of Examples 16-21, and wherein the first virtual channel is non-blocking with respect to the second virtual channel.

Example 23 includes the subject matter of any of Examples 16-22, and wherein the first communication controller is to receive the first debug data from the second semiconductor chip during a period of time in which the second semiconductor chip is in a low power state.

Example 24 includes the subject matter of any of Examples 16-23, and further including a third communication controller that is to communicate with the second chip over a communication interface, wherein the communication interface is disabled during the period of time in which the second semiconductor chip is in the low power state.

Example 25 includes the subject matter of any of Examples 16-24, and wherein the first debug data comprises first trace data and the second debug data comprises second trace data.

Example 26 includes a system comprising one or more means to perform any of the operations of Examples 16-25.

Example 27 includes one or more non-transitory computer readable media when executed to perform any of the operations of Examples 16-25.

What is claimed is:

1. An apparatus comprising:
a first semiconductor chip comprising:
a first communication controller to receive first debug data from a second semiconductor chip;
a memory to store the first debug data from the second semiconductor chip and second debug data of the first semiconductor chip; and
a second communication controller to transmit the first debug data from the second semiconductor chip and the second debug data of the first semiconductor chip to an output port of the first semiconductor chip.

2. The apparatus of claim 1, wherein the first communication controller comprises an Enhanced Serial Peripheral (eSPI) controller.

3. The apparatus of claim 1, wherein the second communication controller comprises a Universal Serial Bus controller.

4. The apparatus of claim 1, wherein the first communication controller is to receive the first debug data over a first virtual channel that shares an out-of-band physical channel with a second virtual channel.

5. The apparatus of claim 4, wherein the first virtual channel is non-blocking with respect to the second virtual channel.

6. The apparatus of claim 1, wherein the first communication controller is to receive the first debug data from the second semiconductor chip during a period of time in which the second semiconductor chip is in a low power state.

7. The apparatus of claim 6, further comprising a third communication controller that is to communicate with the second semiconductor chip over a communication interface, wherein the communication interface is disabled during the period of time in which the second semiconductor chip is in the low power state.

8. The apparatus of claim 1, wherein the second communication controller is to receive Joint Test Action Group (JTAG) commands for the first semiconductor chip and the second semiconductor chip.

9. The apparatus of claim 1, wherein the first communication controller is to convert the first debug data into a format that is used by a trace source of the first semiconductor chip to communicate the second debug data to the memory.

10. The apparatus of claim 1, wherein the first debug data comprises first trace data and the second debug data comprises second trace data.

11. The apparatus of claim 1, the first semiconductor chip further comprising circuitry to convert the first debug data from a first format to a second format prior to storage of the first debug data in the memory, wherein the second format is an internal fabric format of the first semiconductor chip.

12. The apparatus of claim 11, wherein the second communication controller is to transmit the first debug data and the second debug data to the output port of the first semiconductor based on a determination that a threshold storage amount of debug data is stored in the memory.

13. The apparatus of claim 1, wherein the first communication controller is to receive the first debug data from the second semiconductor chip during a period of time in which the second semiconductor chip is in a low power state, wherein in the low power state one or more first communication interfaces between the first semiconductor chip and the second semiconductor chip are disabled while a second communication interface used to transport the first debug data to the first communication controller is enabled.

14. A method comprising:
   receiving, by a first communication controller of a first semiconductor chip, first debug data from a second semiconductor chip;
   storing, by a memory, the first debug data from the second semiconductor chip and second debug data of the first semiconductor chip; and
   transmitting, by a second communication controller of the first semiconductor chip, the first debug data from the second semiconductor chip and the second debug data of the first semiconductor chip to an output port of the first semiconductor chip.

15. The method of claim 14, wherein the first communication controller comprises an Enhanced Serial Peripheral (eSPI) controller.

16. The method of claim 14, further comprising receiving, by the second communication controller, Joint Test Action Group (JTAG) commands for the first semiconductor chip and the second semiconductor chip.

17. The method of claim 14, further comprising converting the first debug data into a format that is used by a trace source of the first semiconductor chip to communicate the second debug data to the memory.

18. The method of claim 14, further comprising receiving the first debug data over a first virtual channel that shares an out-of-band physical channel with a second virtual channel.

* * * * *